Feb. 2, 1965 R. W. STENZEL ET AL 3,167,949
METHOD AND APPARATUS FOR MEASURING DISPERSED MATERIALS IN OILS
Original Filed Aug. 20, 1959
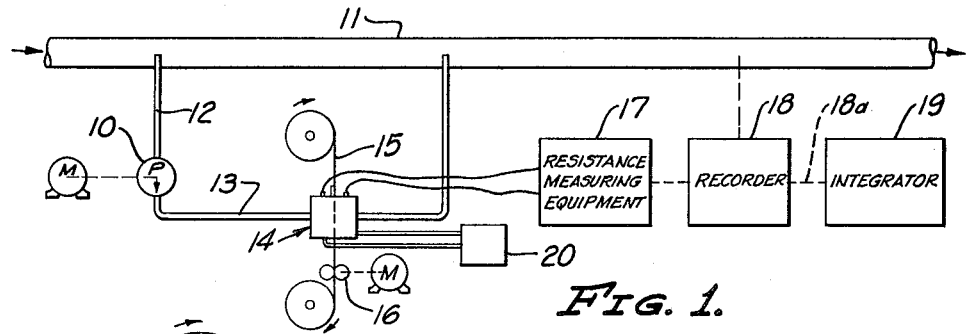
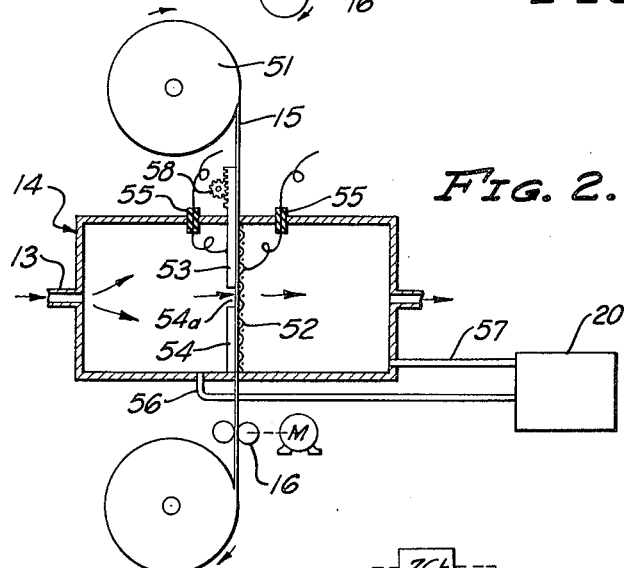
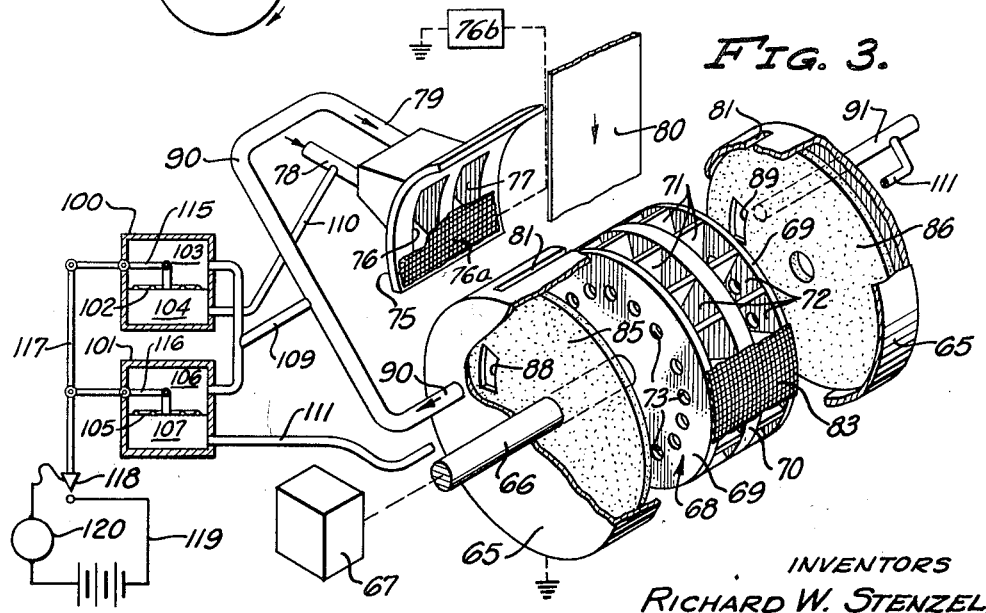
INVENTORS
RICHARD W. STENZEL,
WILLIAM F. EBERZ United States Patent Office 3,167,949
Patented Feb. 2, 1965

3,167,949
METHOD AND APPARATUS FOR MEASURING
DISPERSED MATERIALS IN OILS
Richard W. Stenzel, Palos Verdes Estates, Calif. (1681
Tam O'Shanter Road, Palos Verdes Estates, Calif.), Tam O'Shanter Road, Apt. 10-L, Seal Beach, Calif.),
and William F. Eberz, 34812 Doheny Place, Capistrano Beach, Calif.
Continuation of application Ser. No. 834,972, Aug. 20,
1959. This application Aug. 8, 1962, Ser. No. 218,475
9 Claims. (Cl. 73—53)

This application is a continuation of our application S.N. 834,972 filed August 20, 1959, now abandoned.

This invention concerns the detection and measurement of dispersed contaminants, such as solids and water particles in petroleum distillates. It is becoming increasingly important for the industrial use of many types of petroleum distillates that they be free of entrained water and solid matter. Such dispersed materials are often deleterious to burners, engines, and other equipment in which such distillates are used as fuels. Especially noteworthy in this connection is the use of fuels for jet planes, whose engines and appurtenant equipment often have very small clearances in their moving parts, so that solids can wedge in them to obstruct flow of the fuel or to cause excessive wear on the parts. Dispersed water is also undesirable since it can freeze at the low temperatures to which such fuels are often exposed and thereby ice-over screens, filters, inlet jets, etc. causing a stoppage of the fuel flow.

In petroleum refinery operations the presence of water and solids in oil streams is generally to be avoided as much as possible. Such contaminants have adverse effects on catalysts where the oils are subjected to catalytic processoperations, so that the amounts of such substances present usually have to be kept below certain maximum limits. In the case of refined products which are sent to the market, dispersed water gives a cloudy or hazy appearance to the oil and therefore detracts from its customer acceptance. It is therefore highly desirable to have available a method and apparatus which can detect and measure this type of contaminant and which can also give an alarm in case certain predetermined maximum limits are exceeded.

The types of contaminants mentioned find their way into petroleum products by various means. In some cases, aqueous droplets are carried over from prior processing operations, such as in acid or caustic treating or water-washing. Gross water is sometimes drawn from the bottom of tanks into the suction lines and then very highly dispersed by the action of the pumps, valves and other turbulence creating equipment. Solids usually are in the form of finely divided iron and siliceous materials, commonly the result of corrosion and erosion of tanks, pipelines, etc. Even slimy bacterial growth materials are sometimes developed in the storage of petroleum oil in the presence of water to add to the contamination.

It is an object of the invention to determine the amount of water and solids present in an oil. It is a further object of the invention to detect and measure these materials in a continuously flowing stream. Another object of the invention is to detect and measure these materials continuously. A still further object of the invention is to indicate and record the presence of these materials in a continuous manner so that the degree of purity of the stream can be at all times indicated or recorded. Another object of the invention is to provide means for sampling a hydrocarbon oil and passing the sample through an apparatus for detecting and measuring the amounts of aqueous and solid contaminants present. Another object is to determine the amount of solids present by passing the sample stream through a filter and noting or measuring the pressure drop across the filter to obtain a measure of the amount of such solids. Another object of the invention is to give a signal or sound an alarm when the amount of water or sediment as determined by the instrument exceeds a predetermined value.

The invention can best be described by referring to the figures of the accompanying drawings.

FIG. 1 is a diagrammatic sketch showing the way the invention is utilized commercially in conjunction with a flowing stream of an oil containing suspended solid or liquid particles.

FIG. 2 also diagrammatically shows more details of the instrument used to measure the oil contaminants.

FIG. 3 is an exploded view of an alternative embodiment of an instrument suitable for performing the measurements required in this method.

In FIG. 1 there is shown a sample pump 10 taking suction on a source of supply of the oil to be tested.

The illustration is of a method and apparatus for determining the amount of dispersed material in a line 11 through which the oil is flowing. This is for illustration purposes only and we do not wish to be limited to such a particular operation. For example, the sampling could be done from a tank or other container as well.

The sample is taken by the suction of the sample pump 10 through the sampling line 12 and fed to the detecting instrument 14 through the transfer line 13.

The detecting instrument 14 consists essentially of a container into which the flowing stream is introduced and which is separated into two chambers by a filter medium such as a filter paper or cloth 15 which is continuously or semi-continuously pulled through the cell by some convenient drive mechanism 16. The amount of filter medium exposed to the stream at any one time can be varied by an adjustable aperture arrangement so that a small or large area, as required, can be exposed to the stream. After passing through the instrument, the sample stream is conducted back to the original sample source, or to waste.

A more detailed idea of the operation of the detecting instrument 14 can be gained by referring to the diagrammatic sketch of FIG. 2. The filter medium 15 is drawn from a drum 51 through a suitable opening in the instrument, by a conventional drive represented by a motor and rollers, 16. On the downstream side of the filter medium is a screen or perforated metal plate, 52, against which the strip of filter medium is pressed by the diaphragms 53 and 54, to keep the filter medium in place and to seal it off against fluid leakage. The filter medium is therefore in close contact with the diaphragm and the supporting screen and these are constructed to act as electrodes by which the resistance of the filter medium between them can be measured. This is accomplished by insulating the screen and diaphragm electrically from each other and from the housing, connecting leads to each, and conducting them outside of the instrument through bushings 55 to conventional commercial resistance measuring equipment 17 (FIG. 1) which can measure such resistances appropriately. One of the electrodes may be grounded, i.e. directly connected to the metallic wall of the instrument housing or both may be separately insulated as noted.

In operation the oil is pumped into the first chamber of the instrument 14 and forced to flow through an adjustable aperture 54a in the diaphragm 53, 54 through the moving filter medium 15 into the second chamber and then out of the instrument. If dispersed water is present in the sample stream, it will be caught by the filter medium and thereby wet it. Dry filter paper or cloth has a very high resistance but the presence of a small amount of water greatly reduces it, so that a measure of the resistance of the paper or other filter medium will correspondingly give an indication of the amount of water deposited. This resistance is detected by the instrument 17 of FIG. 1 which can relay its message through a conventional recorder 18 and finally to an integrator 19 which will compile information on the total amount of water passing through the instrument over any period of time. The coupling between the recorder and indicator is suggested by the dotted line 18a. These instruments are conventional and need not be here described. In order to make these instrument readings represent the concentration and total amount of water passing through the oil line 11 it is desirable to run the recorder charts at a speed proportional to the flow of oil in this line, by any of numerous means known to the art. This can readily be done by conventional methods, using pressure drops across an orifice or pitot tube to sense the oil stream velocities in the pipe and relay this to the chart drive mechanism by mechanical, hydraulic or other coupling means schematically indicated by the dotted line between the pipe 11 and the recorder 18.

Referring again to FIG. 2, if the oil sample stream contains solid materials, they will be caught by the filter paper and tend to build up thereon. This accumulation will cause the flow to be restricted somewhat and thereby produce an increase in pressure difference in the instrument between the chambers upstream and downstream from the filter. This differential pressure can be measured by conventional means and may be done simply by using connecting tubes 56 and 57 from the upstream and downstream chambers and connecting them to a pressure differential meter 20 which can operate with a diaphragm mechanism or by other usual methods for converting the differential pressure to mechanical or electric impulses that are recorded on the chart. The chart of this instrument is again preferably run at a speed proportional to the oil passing through the oil line in the manner described for the conductivity meter. In both the conductivity and differential pressure measurement devices, it is desirable to connect an alarm system which will alert operators in case maximum limits of water and sediment are exceeded. These are common devices and need not be separately described.

As has previously been indicated, the diaphragm 53, 54 can be provided with an adjustable aperture or opening 54a, thus a rack and pinion arrangement 58 can be employed for moving one portion 53 of the diaphragm relative to the other portion 54 to control the area of the filter medium exposed to the incoming stream.

The above description has exemplified an instrument which simultaneously performs the dual function of detecting and measuring the water and sediment content of the oil sample streams. In some instances it is impractical to do this with a single filter element, and in that case the sediment and water can be separately detected by having the water-sensing mechanism placed in an independent chamber from that of the sediment pressure developing device. Thus two instruments, one for measuring the water and the other for measuring the sediment can be arranged in tandem or in parallel in the oil sample stream so that one will not interfere with the determination of the other. The manner in which this is done need not be separately described. The characteristics of the oil stream and the particular interest of the user will determine which method is most suitable for his particular purposes.

In the method described the sample stream is pumped at a constant rate through the detecting instrument and the filter medium is pulled through it at a constant rate also. However, in some cases it is more desirable, for example in an instrument detecting water only, to drive the filter medium at a rate so that the conductivity between the electrodes is maintained constant rather than the speed of travel. In such a case, the filter drive 16 can be connected to a bridge or other detection device in place of the conventional meter 17 so that if the amount of water adsorbed by the filter increases, the speed of the drive will also increase, thereby maintaining the resistance at a constant value. The speed of the motor drive can then be sensed to drive an indicator or a pen on a chart which produces a deflection proportional to the speed of the drive. This is easily done by conventional methods. If no water at all is carried by the system, the indicator or pen deflection would in the system just mentioned remain at a zero indication. However, it is desirable from a practical standpoint to always have some movement of the filter medium through the cell so that with high resistances, such as would be the case when no water is carried by the oil sample, the filter would be driven at some minimum slow speed. After a certain predetermined minimum amount of water is being deposited on the filter, the drive would be made to speed up and then remain proportional to the conductivity, as previously described.

The rate of flow of the oil sample through the instrument will be limited to a considerable extent by the breaking strength of the filter medium, i.e. by the pressure drop across it, but it is obviously desirable to flow the oil through as rapidly as possible in order to reduce the amount of lag in the system to a minimum.

The response of the water-sensing element can be made more sensitive by a prior incorporation into the filter medium of a small amount of a non-hygroscopic salt, such as sodium chloride, so that the water salinity will be sufficiently high to greatly increase its conductivity. Such a feature would also tend to reduce any effects of the salinity of the water particles carried by the oil, thus giving nearly the same reading whether a fresh or salty water were being deposited.

The sample pump 10 is preferably a constant speed positive displacement pump which will maintain a uniform flow of the sample stream through the instrument from the oil source.

In order to make certain that the water will be readily caught by and wet the filter medium, it is sometimes also desirable to impregnate the latter with a small amount of a surface-active agent which will insure that not only the water particles are caught but also that they will spread rapidly by capillarity through the fibers of the filter. Such materials can also be selected from groups which are ionic in nature and which will increase the conductivity of the filter medium when water is deposited on it. Anionic and cationic materials of this kind are particularly suitable, and of these groups the amine types contribute desirably to the conductivity. Inorganic conductivity-promoting salts previously mentioned may be used in conjunction with these surfactants.

The apparatus and procedure described are essentially the simplest form of the present invention that can be employed. Problems sometimes arise however, because a change in the oil stream characteristics (viscosity, conductivity, etc.) or in the nature of the filter medium (porosity, thickness, etc.) will cause corresponding changes in conductivity or pressure drops not related to the amount of water or solids present in the system. It is therefore desirable to avoid such spurious indications, and this can be done by placing two of the instruments shown in FIG. 2 side-by-side, with filter paper from the same roll being fed past each aperture. By conducting the oil passing through the first instrument directly to the second, the latter receives a filtered oil so that the pressure drop in this instrument will depend only on the characteristics of the oil itself. The difference between the two pressure drops in the two instruments will thus truly be a function only of the amount of the dispersed material held on the filter of the first instrument. Similar considerations apply also to the resistance measurements.

Rather than detailing the dual instrumentation mentioned above, a somewhat more sophisticated and commercially more desirable embodiment of this variation of the invention will be described. FIG. 3 shows an embodiment of the detecting instrument which is particularly suitable for carrying out the process. It is an exploded view to show the relative position of the various parts and the flow pattern involved. Shown is a cylindrical housing 65 journaling a shaft 66 connected to a suitable drive 67 driving the shaft at a speed required to conduct the filter medium through the equipment shown. Turning with the shaft inside the housing is a rotating drum 68 made of two end discs 69 to form a chamber which is partitioned by an intermediate disc 70 which serves to form a first and a second compartment. Each of the latter is further divided by fins 71 to form two series of radial cells 72. Each end disc 69 has holes 73 respectively communicating with corresponding cells 72.

An arcuate stationary shoe 75 is attached to a chamber which has a partition dividing it into a first compartment 76 and a second compartment 77. The shoe 75 fits inside the housing 65 and conforms to the curvature of the drum. This shoe has openings 76 and 77 respectively aligned with the series of cells 72. Pipes 78 and 79 respectively communicate with the openings 76 and 77.

A strip of the filter medium 80 enters any suitable slot 81 of the housing and is carried along by the rotating drum 68 past the openings 76 and 77 of the shoe 75. It is usually preferable to mount a screen or perforated metal element 83 on the periphery of the drum to cover the cells and give added support to the filter medium. This screen can act as an electrode when resistance measurements are to be made.

At opposite ends of the drum 68 are stationary discs 85 and 86 suitably secured to the ends of the housing and made of Neoprene or other sealing material. The end discs 69 of the drum slide thereagainst and pairs of the openings 73 successively register with ports 88 and 89 of the stationary discs. Pipes 90 and 91, respectively for filtered and refiltered oil, conduct from the housing the material respectively entering the ports 88 and 89. The pipe 90 is connected to the pipe 79 previously described.

The sample stream enters the pipe 78 and reaches the opening 76 which distributes it between two adjacent cells 72 of the left-hand series. The sample enters these cells through the adjacent filter medium 80 and flows out of these cells through the corresponding holes 73 and the port 88 to the filtered oil pipe 90 which returns it to the other opening 77. Here it again passes through the filter medium 80 into the cells 72 of the right-hand series, flowing thence through the port 89 of the stationary disc 86 and through the re-filtered oil pipe 91.

This system is particularly suitable where it is desired to measure the accumulation of solids on the filter medium and is designed to measure the differential pressure between the downstream side of the filter medium 80 through which the sample has passed and the downstream side of a contiguous portion of the same filter medium from which the sediment has been removed by the first filtration. It permits a sensitive determination of the differential pressure which cancels out other influences such as the particular pore size of the filter used, variations in oil properties, etc. It also makes provision for passing the oil sample through two continuous portions of the same filter medium strip so as to minimize the effect of a variation in porosity which may occur along the length of the strip.

The differential pressures can be measured in any suitable way. FIG. 3 diagrammatically shows two cells 100 and 101. The former is divided by a diaphragm 102 into compartments 103 and 104. The cell 101 is divided by a diaphragm 105 into compartments 106 and 107. The compartments 103 and 106 are connected together and to the filtered oil pipe 90 by a pipe 109. The compartment 104 is connected by a pipe 110 to the inlet pipe 78 while the compartment 107 is connected by a pipe 111 with the re-filtered oil pipe 91.

The movements of the diaphragms 102 and 105 are translated to linear motion outside the cells by levers 115 and 116 and it will be seen that these levers will tend to move in opposite directions. Such levers are linked by a rod 117 which actuates a switch 118 in a circuit 119 which may include a signal device, recorder, etc., indicated by the numeral 120, which serves to indicate any unusual pressure differential. It is readily apparent that the arrangement shown cancels out the pressure drop through the filter itself and is therefore sensitive only to any pressure developed in excess of this pressure drop, such as that caused by the accumulation of solids on the first filter. If the forces on the levers 115 and 116 are unbalanced due to solid accumulation, there will be a net movement of the rod 117 in a downward direction which can be used to actuate the switch 118. The position of the rod 117 is related to the actual amount of the difference in pressure and thus to the solid accumulation from time to time.

When it is desired also to detect the water content, the system of FIG. 3 can be modified to position a screen or perforated plate in the opening 76 of the shoe 75 and insulated from the housing. The resistance between this screen and the screen 83 respectively engaging opposite surfaces of the filter medium 80 can be measured and indicated by instrumentation 76b which may function similar to that of 17, 18 and 19 of FIG. 1. Electrical connections to instruments 76b can be made directly to the insulated screen 76a and to the housing 65 in electrical contact with the screen 83, or the housing may be grounded and contact made to 76b through a ground connection as shown. The observed or recorded resistance can then be simply related to the water content of the sample.

Still another variation which allows a determination of total solids and water in oils is possible with the procedure and apparatus above described. In the description, it was considered that in order to determine the dispersed water content, the water particles should wet the filter paper so as to make possible the registration of increase in conductance of the filter paper area involved. Wetting agents to improve this wettability were also suggested. However, if the paper is treated with a hydrophobic agent, such as with a silicone or Teflon resin etc., the water particles will not wet the filter and will be retained thereon while allowing the oil to pass through. An accumulation of water particles on the surface of the filter will of course increase the pressure drop through the filter and by using the device described above as applicable to the detection of the accumulation of solids, a registration of the total amount of solids and water collected on the filter paper can readily be obtained. For this purpose, the conductivity device need not be used since the pressure differential cell alone will achieve the desired objective. In impregnating the filter paper with hydrophobic materials, care must of course be taken that the pores are not sealed, but the technique is well known in the art and such filter media are commercially available.

In describing the procedure and the devices proposed, emphasis is placed on a renewal of the filter medium either continuously or semi-continuously. This is of course highly advantageous since the sudden passage of a large amount of solids or dispersed liquids will quickly plug up any stationary device and render it unsuitable for any further determination.

The description herein has been largely exemplified in the nature of dispersed water and solids as contaminants in the oil system. The procedure and apparatus are equally applicable to any dispersed material present in the oil stream, such as acids, bases, salts, resins, bacterial growths, etc. and we do not wish to be limited by the exemplifications.

We claim as our invention:

1. Apparatus for measuring the amount of suspended material in an oil stream, comprising first and second chambers having a common wall that is comprised of two spaced, rectangular plates in the same plane having parallel edges that define an aperture between the chambers to permit the flow of oil therethrough, said edges being movable relative to each other and having means for adjusting the size of said aperture; an inlet port in the first chamber and an outlet port in the second; means for supplying oil from said stream to said inlet port and means for removing it from said outlet port, a strip of filter medium covering and overlapping said aperture, said filter strip being impregnated with a material which is ionized by water selected from the group consisting of anionic and cationic surface active agents, means for continuously moving said filter strip past said aperture to continually expose fresh filter surface to the stream of oil flowing therethrough, a perforate metallic member in contact with and supporting said filter medium but electrically insulated from all portions of said chambers except said filter medium, and means for determining the electrical resistance between the perforate membrane and said wall containing said aperture.

2. Apparatus as described in claim 1, in which the material with which the filter medium is impregnated includes a non-hygroscopic water-soluble salt.

3. Apparatus for measuring the amount of suspended material in an oil stream, comprising first and second chambers having a common wall that has an aperture to establish communication between the chambers and thus permit flow of oil therethrough, an inlet port in the first chamber and an outlet port in the second, means for supplying oil from said stream to said inlet port and means for removing it from said outlet port, a strip of filter medium covering and overlapping said aperture, said filter strip being impregnated with a material which is hydrophobic, to retain the water on the filter while allowing the oil to pass through it, means for continuously moving said filter strip past said aperture to continually expose fresh filter surfaces to the stream of oil flowing therethrough, a perforate metallic member in contact with and supporting said filter medium, a differential pressure gauge and hydraulic connections from the two chambers to the pressure gauge for measuring the pressure drop between them.

4. Apparatus for measuring the amount of suspended material in an oil stream comprising a first chamber with a partition to divide it into first and second compartments, oil inlet ports for each compartment, adjacent oil outlet apertures in each compartment spaced from said inlet ports, a second chamber also divided into first and second compartments, adjacent oil inlet apertures in each compartment of the second chamber aligned with and in close proximity to said outlet apertures of the first chamber, a perforate member covering the inlet apertures of the compartments of said second chamber, a filter medium positioned between the outlet apertures of the first chamber and said perforate member and covering the outlet apertures of said first chamber, means for continually moving said filter past said apertures to expose fresh filter areas to the stream of oil moving therethrough, conduit means for introducing oil into the first compartment of the first chamber to cause said oil stream to flow through the aligned outlet and inlet apertures of the first compartments of the first and second chambers respectively and thereby through the filter medium and the perforate member situated between said aligned apertures, conduit means for flowing the oil from the first compartment of the second chamber to the second compartment of the first chamber and thence through the filter medium and perforate member via the aligned apertures of the second compartments of the first and second chambers respectively, and means for measuring the pressure drops between the first compartments of the first and second chambers and between the second compartments of said chambers.

5. Apparatus as defined in claim 4 including means responsive to the difference in said pressure drops.

6. Apparatus as defined in claim 4 including a second perforate member covering the outlet apertures of the first chamber and electrically insulated therefrom, said perforate members thus being on opposite sides of said filter medium, and means for measuring the electrical resistance between said perforate members.

7. Apparatus as described in claim 4 in which said second chamber is in the form of a rotatable drum with radial partitions dividing each compartment of said second chamber into a plurality of cells, each cell having its own inlet aperture and outlet port, an arcuate shoe defining said outlet apertures of said first chamber and conforming to the curvature of the drum, said drum and shoe being enclosed in a stationary housing, a shaft fastened to the axis of said drum and journaled through said housing, means for rotating said shaft, stationary sealing discs at the opposite ends of said housing and in sealing engagement with the respective drum ends, one of said discs having a port communicating sequentially with the outlet ports of the cells of the first compartment as the drum is rotated, said disc port communicating with a matching hole in the end of the housing in contact with the disc, said hole being also in communication with said conduit for conducting oil to said second compartment of the said first chamber, a port in the opposite disc communicating sequentially with the outlet ports of the cells of the second compartment, said port of said opposite disc communicating with a matching hole in the end of the housing in contact with said opposite disc.

8. Apparatus for measuring the amount of suspended material in oil streams comprising two serially connected instruments each comprised of first and second chambers having a common wall that has an aperture to establish communication between the chambers and thus permit flow of oil therethrough, an inlet port in the first chamber and an outlet port in the second, means for supplying oil from such streams to said inlet port and means for removing it from said outer port, a strip of filter medium covering and overlapping said aperture, means for continuously moving said filter strip past said aperture to continually expose fresh filter surfaces to the stream of oil flowing therethrough, a perforate metallic member in contact with and sppporting said filter medium, conduit means connecting the second chamber of the first the instruments to measure the difference in pressure drops strument and hydraulic connections from the chambers of the instrument to measure the difference in pressure drops between the two chambers of each instrument.

9. The apparatus as described in claim 8 but including means by which the filter medium strips are supplied to the aperture of each instrument from the same roll of filter medium.

References Cited by the Examiner
UNITED STATES PATENTS

| 1,517,144 | 11/24 | Anderson | 72—28 |
| 1,599,964 | 9/26 | Haven | 73—61 X |
| 2,532,822 | 12/50 | Schafer | 73—29 X |
| 2,710,324 | 6/55 | Harmantas et al. | 73—336.5 X |
| 2,734,377 | 2/56 | Traver | 73—53 |
| 2,752,586 | 6/56 | Jordan | 340—235 |
| 3,041,870 | 7/62 | Levine | 73—53 |
| 3,123,812 | 3/64 | Woodling | 73—336.5 X |

RICHARD C. QUEISSER, Primary Examiner.

JOHN P. BEAUCHAMP, Examiner.